US010182452B2

(12) United States Patent
Chen et al.

(10) Patent No.: US 10,182,452 B2
(45) Date of Patent: Jan. 15, 2019

(54) TECHNIQUES FOR COMMUNICATING FEEDBACK IN LOW LATENCY WIRELESS COMMUNICATIONS

(71) Applicant: QUALCOMM Incorporated, San Diego, CA (US)

(72) Inventors: Wanshi Chen, San Diego, CA (US); Seyedkianoush Hosseini, San Diego, CA (US); Peter Gaal, San Diego, CA (US); Shimman Arvind Patel, San Diego, CA (US); Jing Sun, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 66 days.

(21) Appl. No.: 15/458,293

(22) Filed: Mar. 14, 2017

(65) Prior Publication Data
US 2018/0049226 A1 Feb. 15, 2018

Related U.S. Application Data

(60) Provisional application No. 62/373,823, filed on Aug. 11, 2016.

(51) Int. Cl.
*H04L 1/18* (2006.01)
*H04L 5/00* (2006.01)
(Continued)

(52) U.S. Cl.
CPC ....... *H04W 72/1268* (2013.01); *H04L 1/1861* (2013.01); *H04L 5/001* (2013.01); *H04L 5/0055* (2013.01); *H04W 76/15* (2018.02)

(58) Field of Classification Search
CPC ..... H04L 1/1861; H04L 5/001; H04L 5/0055; H04W 72/1268; H04W 76/15
See application file for complete search history.

(56) References Cited

U.S. PATENT DOCUMENTS

2007/0058595 A1* 3/2007 Classon ................ H04L 1/1812
370/337
2011/0194516 A1* 8/2011 Aiba ...................... H04L 1/0026
370/329
(Continued)

OTHER PUBLICATIONS

International Search Report and Written Opinion—PCT/US2017/035145—ISA/EPO—dated Aug. 10, 2017.
(Continued)

*Primary Examiner* — Kashif Siddiqui
(74) *Attorney, Agent, or Firm* — Anthony R. Morris

(57) ABSTRACT

Various aspects described herein are related to communicating feedback communications received over multiple component carriers (CCs) in wireless communications. The communications can be received from a serving node over the multiple CCs configured in carrier aggregation or multiple connectivity. One or more of the multiple CCs can be determined for transmitting feedback regarding the communications received over at least one CC of the multiple CCs, wherein the one or more of the multiple CCs are selected for transmitting the feedback based at least in part on a transmission time interval (TTI) duration for the at least one CC. Feedback related to receiving the communications from the serving node over the at least one CC can be transmitted over the one or more of the multiple CCs.

30 Claims, 9 Drawing Sheets

(51) Int. Cl.
*H04W 72/12* (2009.01)
*H04W 76/15* (2018.01)

(56) References Cited

U.S. PATENT DOCUMENTS

| | | | | |
|---|---|---|---|---|
| 2016/0105905 | A1* | 4/2016 | Vajapeyam | H04W 72/1263 |
| | | | | 370/330 |
| 2016/0164643 | A1* | 6/2016 | Loehr | H04L 1/1854 |
| | | | | 370/336 |
| 2017/0215179 | A1* | 7/2017 | Choi | H04W 72/0413 |
| 2017/0223702 | A1* | 8/2017 | Yin | H04L 1/1812 |
| 2018/0048451 | A1* | 2/2018 | Yin | H04L 5/0055 |
| 2018/0199322 | A1* | 7/2018 | Takeda | H04W 72/044 |

OTHER PUBLICATIONS

NTT DOCOMO., et al., "Discussions on TTI shortening," 3rd Generation Partnership Project (3GPP), Mobile Competence Centre ; 650, Route Des Lucioles ; F-06921 Sophia-Antipolis Cedex; France; R1-163175, vol. RANB WG1, No. Busan, Korea; Apr. 11, 2016-Apr. 15, 2016, Apr. 1, 2016 (Apr. 1, 2016), XP051079880, pp. 7. Retrieved from the Internet: URL:http://www.3gpp.org/ftp/tsg_ran/WG1_RL1/TSGR1_84b/Docs/ [retrieved on Apr. 1, 2016].

\* cited by examiner

TECHNIQUES FOR COMMUNICATING FEEDBACK IN LOW LATENCY WIRELESS COMMUNICATIONS

CLAIM OF PRIORITY UNDER 35 U.S.C. § 119

The present Application for Patent claims priority to Provisional Application No. 62/373,823, entitled "TECHNIQUES FOR COMMUNICATING FEEDBACK IN LOW LATENCY WIRELESS COMMUNICATIONS" filed Aug. 11, 2016, which is assigned to the assignee hereof and hereby expressly incorporated by reference herein for all purposes.

BACKGROUND

Described herein are aspects generally related to communication systems, and more particularly, to communicating feedback in low latency communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, multiple UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired. Current mechanisms for reporting feedback may not produce expected or desired results in lower latency wireless communication technologies that utilize a shorter TTI (e.g., less than 1 millisecond).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating feedback communications received over multiple component carriers (CCs) in wireless communications is provided. The method includes receiving the communications from a serving node over the multiple CCs configured in carrier aggregation or multiple connectivity, determining one or more of the multiple CCs for transmitting feedback regarding the communications received over at least one CC of the multiple CCs, where the one or more of the multiple CCs are selected for transmitting the feedback based at least in part on a transmission time interval (TTI) duration for the at least one CC, and transmitting, over the one or more of the multiple CCs, feedback related to receiving the communications from the serving node over the at least one CC.

In other aspects, an apparatus for communicating feedback for communications received over multiple component carriers (CCs) in wireless communications is provided. The apparatus includes a transceiver for communicating one or more wireless signals via one or more antennas, a memory configured to store instructions, and one or more processors communicatively coupled with the transceiver and the memory. The one or more processors are configured to receive the communications from a serving node over the multiple CCs configured in carrier aggregation or multiple connectivity, determine one or more of the multiple CCs for transmitting feedback regarding the communications received over at least one CC of the multiple CCs, where the one or more of the multiple CCs are selected for transmitting the feedback based at least in part on a transmission time interval (TTI) duration for the at least one CC, and transmit, over the one or more of the multiple CCs, feedback related to receiving the communications from the serving node over the at least one CC.

In another aspect, an apparatus for communicating feedback for communications received over multiple component carriers (CCs) in wireless communications is provided. The apparatus includes means for receiving the communications from a serving node over the multiple CCs configured in carrier aggregation or multiple connectivity, means for determining one or more of the multiple CCs for transmitting feedback regarding the communications received over at least one CC of the multiple CCs, where the one or more of the multiple CCs are selected for transmitting the feedback based at least in part on a transmission time interval (TTI) duration for the at least one CC, and means for transmitting, over the one or more of the multiple CCs, feedback related to receiving the communications from the serving node over the at least one CC.

In another aspect, a non-transitory computer-readable storage medium for communicating feedback for communications received over multiple component carriers (CCs) in wireless communications is provided. The non-transitory computer-readable storage medium includes code for receiving the communications from a serving node over the multiple CCs configured in carrier aggregation or multiple connectivity, code for determining one or more of the multiple CCs for transmitting feedback regarding the communications received over at least one CC of the multiple CCs, where the one or more of the multiple CCs are selected for transmitting the feedback based at least in part on a transmission time interval (TTI) duration for the at least one CC, and code for transmitting, over the one or more of the multiple CCs, feedback related to receiving the communications from the serving node over the at least one CC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
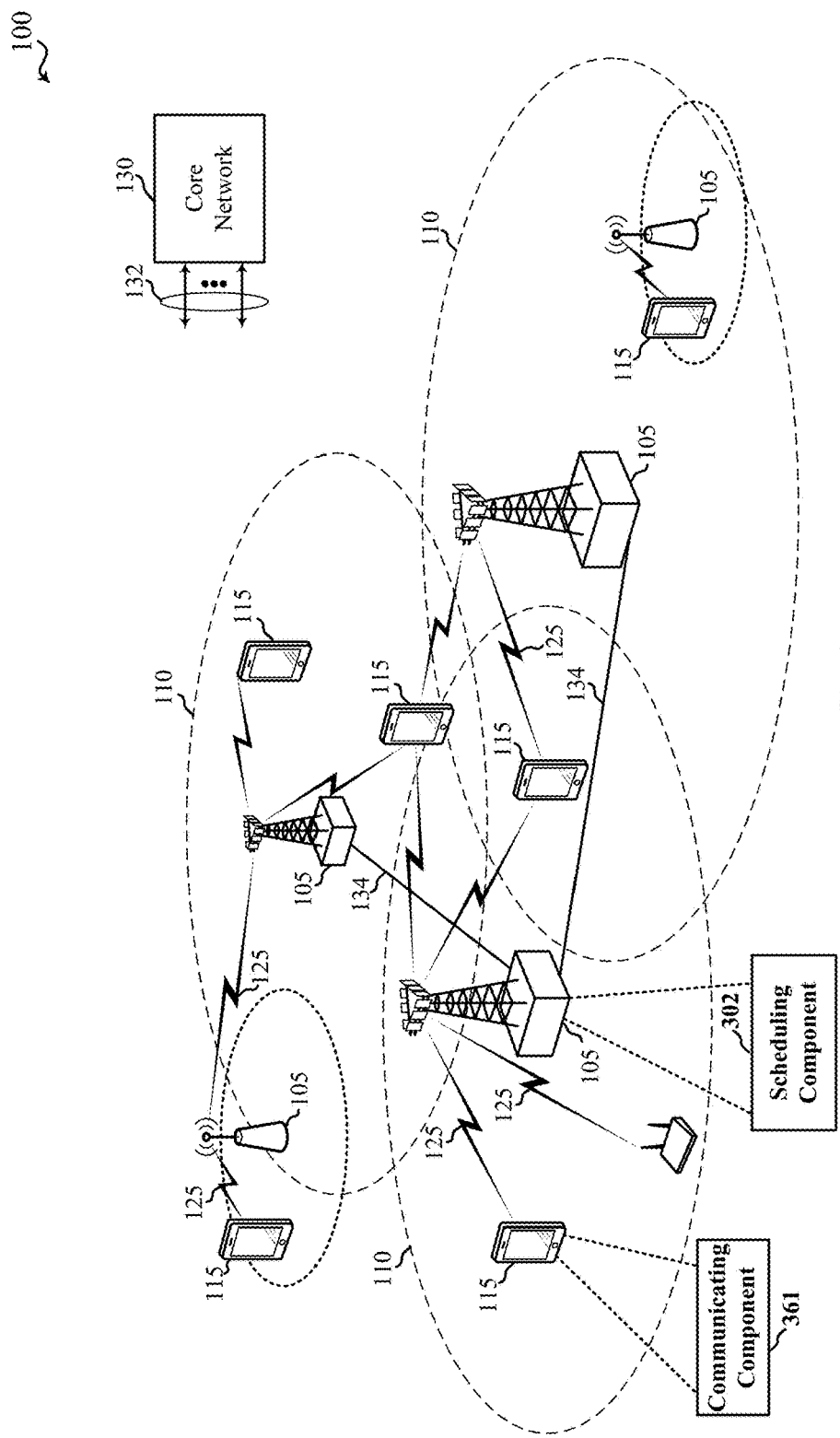
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating feedback in a low latency communication technology (e.g., ultra-low latency (ULL) LTE). For example, a low latency communication technology may be based on a legacy wireless communication technology, such as third generation partnership project (3GPP) long term evolution (LTE), but may utilize different length transmission time intervals (TTI) (e.g., the low latency communication technology may have a shorter TTI duration than the legacy communication technology). For example, a legacy LTE technology may utilize a TTI having a duration of a subframe defined in LTE (e.g., 1 millisecond), where ULL LTE technology can be based on a TTI having a duration less than a subframe (e.g., one symbol, two symbols, four symbols, a subframe slot, etc.). In this regard, a lower latency in communications is achieved by the shorter, more frequent TTI.

Different communication technologies that utilize TTIs of different durations can have different timings for communicating feedback. In one example of low latency communication technologies (such as ULL LTE), shortened TTIs (sTTIs) less than a TTI of a legacy wireless communication technology can be used. For example, ULL LTE can utilize a sTTI of two symbol or one slot in downlink communications, and sTTIs of two symbol, four symbol, or one slot in uplink communications. The different possible sTTIs in this example can have different associated timings for transmitting feedback (e.g., hybrid automatic repeat/request (HARQ) feedback). Generally, in LTE, feedback can generally be transmitted 4 instances of TTI after the TTI during which the associated communications are received (e.g., in legacy LTE, for the 1 ms—1 subframe—TTI, the HARQ timing for transmitting HARQ feedback can be around 4 ms—4 subframes). In this regard, for example, a two symbol sTTI in ULL LTE may have a HARQ timing of around eight symbols, a one slot sTTI may have a HARQ timing of around 4 slots (e.g., 2 ms), etc. Accordingly, the corresponding HARQ feedback channels (e.g., physical uplink control channel (PUCCH), shortened PUCCH (sPUCCH), physical uplink shared channel (PUSCH), shortened PUSCH (sPUSCH), etc.) can have different coverage/link efficiencies. In some configurations, devices communicate using different TTI durations (e.g., 1 ms TTI, one symbol sTTIs, two symbol sTTIs, four symbol sTTIs, one slot sTTIs, etc.) over different component carriers (CC), e.g., as configured in carrier aggregation, dual-connectivity or multiple-connectivity, etc. Such devices can communicate feedback for communications received over the different CCs using various mechanisms, as described herein.

In an example, feedback for communications received over some of the CCs can be grouped for transmitting over a single CC. Specifically, for example, feedback for communications received over a CC configured with a first TTI/sTTI duration can be communicated over a CC (e.g., the same or another CC) configured with a specific TTI/sTTI duration (e.g., the same TTI duration, a different TTI duration, etc.). In one example, an association of the CC configured with the first TTI/sTTI duration to the CC configured with the specific TTI/sTTI duration can be based on determining that the CCs have the same TTI duration or otherwise that the CC with the specific TTI/sTTI duration can accommodate feedback for the CC of the first TTI/sTTI duration. In another example, the CCs can be grouped in a control channel group such that feedback for communications received over the CCs can be transmitted in a control channel over one or more CCs (e.g., which may or may not include one of the CCs in the group). For example, the CCs can be grouped according to supported TTI/sTTI duration. In another example, one or more of the groups of CCs can be divided into one or more subgroups of CCs; for example, a control channel group can be specified as including CCs grouped regardless of supported TTI/sTTI, and the control channel group can be divided into one or more subgroups based on supported TTI/sTTI. In yet another example, for a given control channel group, the CCs assigned to the control channel group may be configured to support the same TTI/sTTI, which may include a single TTI and/or a legacy 1 ms TTI. Additionally, for example, parallel feedback transmissions can be configured for multiple control channels over multiple CCs.

Referring first to FIG. 1, a diagram illustrates an example of a wireless communications system 100, in accordance with aspects described herein. The wireless communications system 100 includes multiple access points (e.g., base stations, eNBs, or WLAN access points) 105, a number of user equipment (UEs) 115, and a core network 130. Access points 105 may include a scheduling component 302 configured to assign multiple CCs to one or more UEs 115 for communicating with the access point 105, and/or an indication of one or more of the multiple CCs as feedback CC(s) for communicating feedback corresponding to at least a portion of the multiple CCs. Similarly, one or more of UEs 115 may include a communicating component 361 configured to receive an assignment of the multiple CCs from one or more access points 105, and/or the indication of the one or more of the multiple CCs as the feedback CC(s) for communicating feedback corresponding to at least a portion of the multiple CCs. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a UE 115 may communicate with access point 105 on one or more of a first hierarchical layer that supports first layer transmissions using a first TTI of a first duration (which may relate to a "legacy wireless communication technology") and a second hierarchical layer that supports second layer transmissions using a second TTI of a second duration, which may be shorter than the duration of the first TTI (such as an sTTI, which may relate to a "ULL communication technology").

In other examples, a UE 115 may communicate with an access point 105 on the second hierarchical layer only. Thus, a UE 115 may belong to a second class of UEs 115 that may communicate on the second hierarchical layer, while another UE 115 may belong to a first class of UEs 115 that may communicate on the first hierarchical layer only. In an example, access point 105 and UE 115 may communicate on the second hierarchical layer through transmissions of subframes of a second subframe type. Access point 105 may transmit communications related to the first or second hierarchical layer only or may transmit communications for both the first and second hierarchical layers. Where an access point 105 supports both the first and second hierarchical layers, communicating component 361 can be configured to prioritize communications received from the access point 105 that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be used to describe the access points 105, though concepts described herein may be applied to other types of access points in other types of communication technologies. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. A UE 115 may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

In an example, one or more access points 105 can assign or activate (e.g., via scheduling component 302) multiple (i.e., two or more) CCs to a UE 115 to communicate using a legacy or ULL communication technology using multiple corresponding TTI/sTTI durations. In addition, scheduling component 302 can indicate or assign one or more of the multiple CCs as feedback CC(s) for communicating feedback for communications received over at least a portion of the multiple CCs. For example, scheduling component 302 can indicate or assign the feedback CC(s) based on one or more aspects regarding a TTI/sTTI of the feedback CC(s) and/or of one or more of the portion of the multiple CCs corresponding to the feedback CC(s), as described further herein. For example, scheduling component 302 can assign the portion of the multiple CCs in a control channel group corresponding to the feedback CC(s) for the UE 115 to utilize in transmitting feedback in a control channel over the feedback CC(s).

Figure 2:
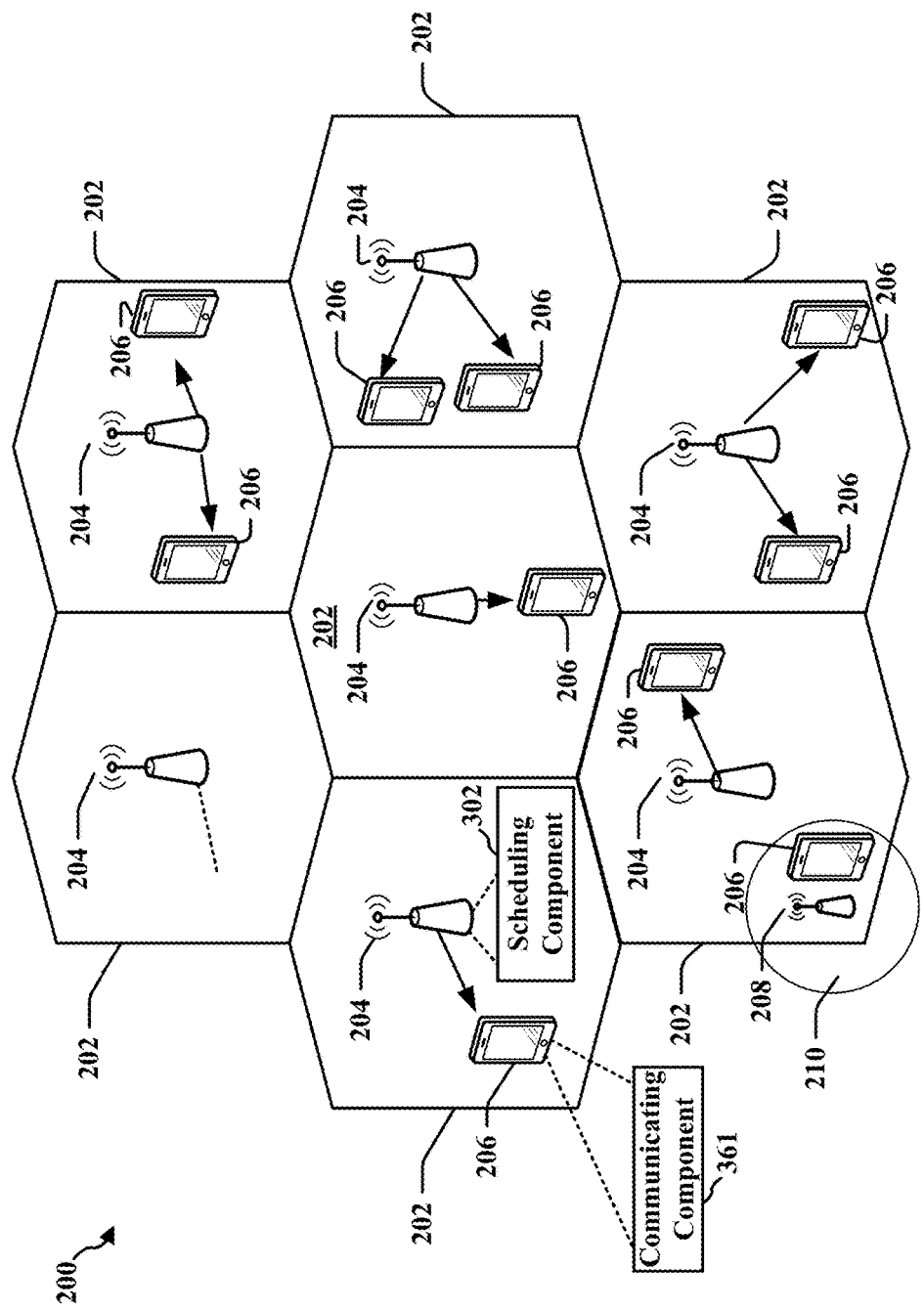
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include a scheduling component 302 configured to assign multiple CCs to one or more UEs 206 for communicating with the eNBs 204 and/or 208, and/or an indication of one or more of the multiple CCs as feedback CC(s) for communicating feedback corresponding to at least a portion of the multiple CCs. Similarly, one or more of UEs 206 may include a communicating component 361 configured to receive an assignment of the multiple CCs from one or more eNBs 204 and/or 208, and/or the indication of the one or more of the multiple CCs as the feedback CC(s) for communicating feedback corresponding to at least a portion of the multiple CCs. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
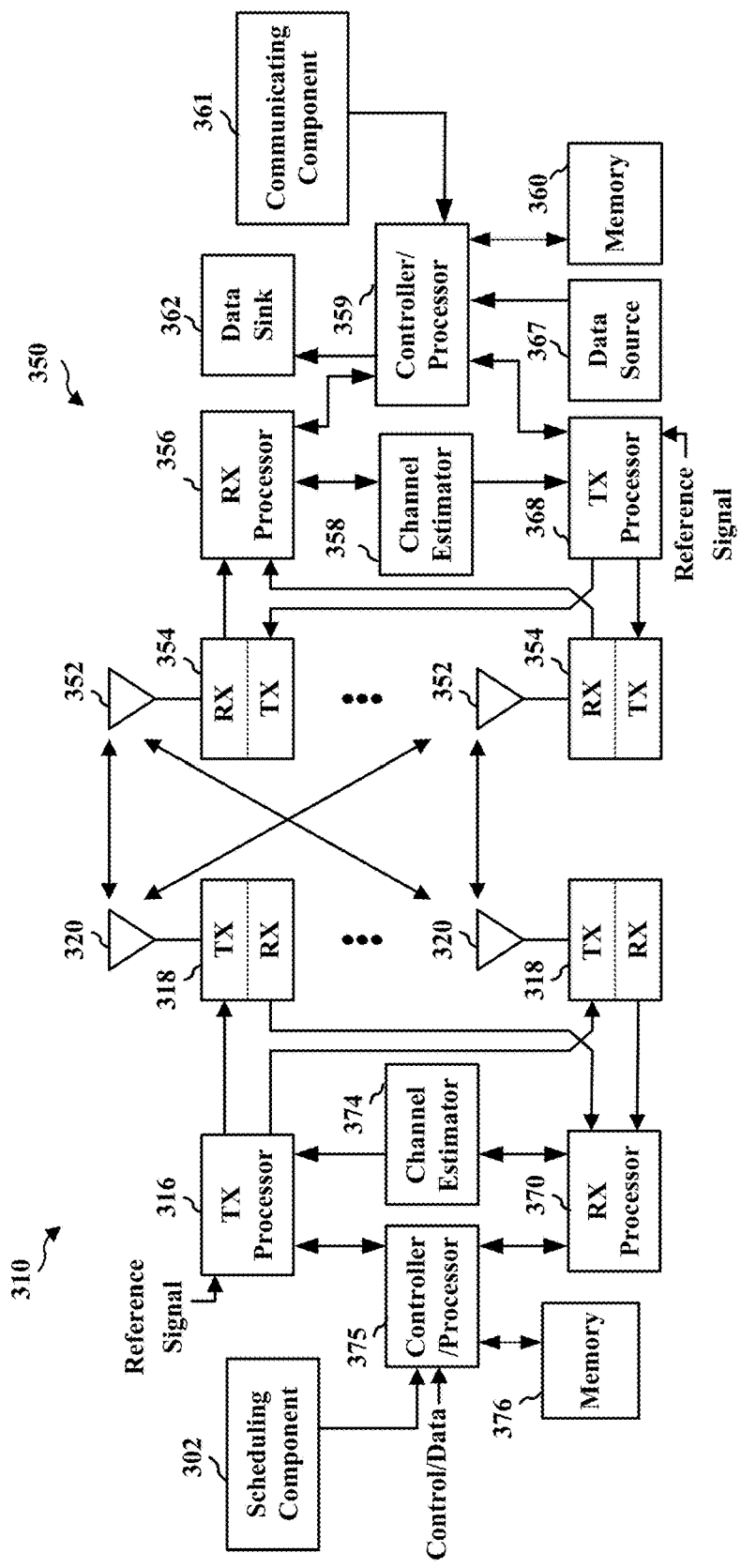
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a scheduling component 302 configured to assign multiple CCs to a UE 350 for communicating with the eNB 310, and/or an indication of one or more of the multiple CCs as feedback CC(s) for communicating feedback corresponding to at least a portion of the multiple CCs. Though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 configured to receive an assignment of the multiple CCs from one or more eNBs 310, and/or the indication of the one or more of the multiple CCs as the feedback CC(s) for communicating feedback corresponding to at least a portion of the multiple CCs. Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
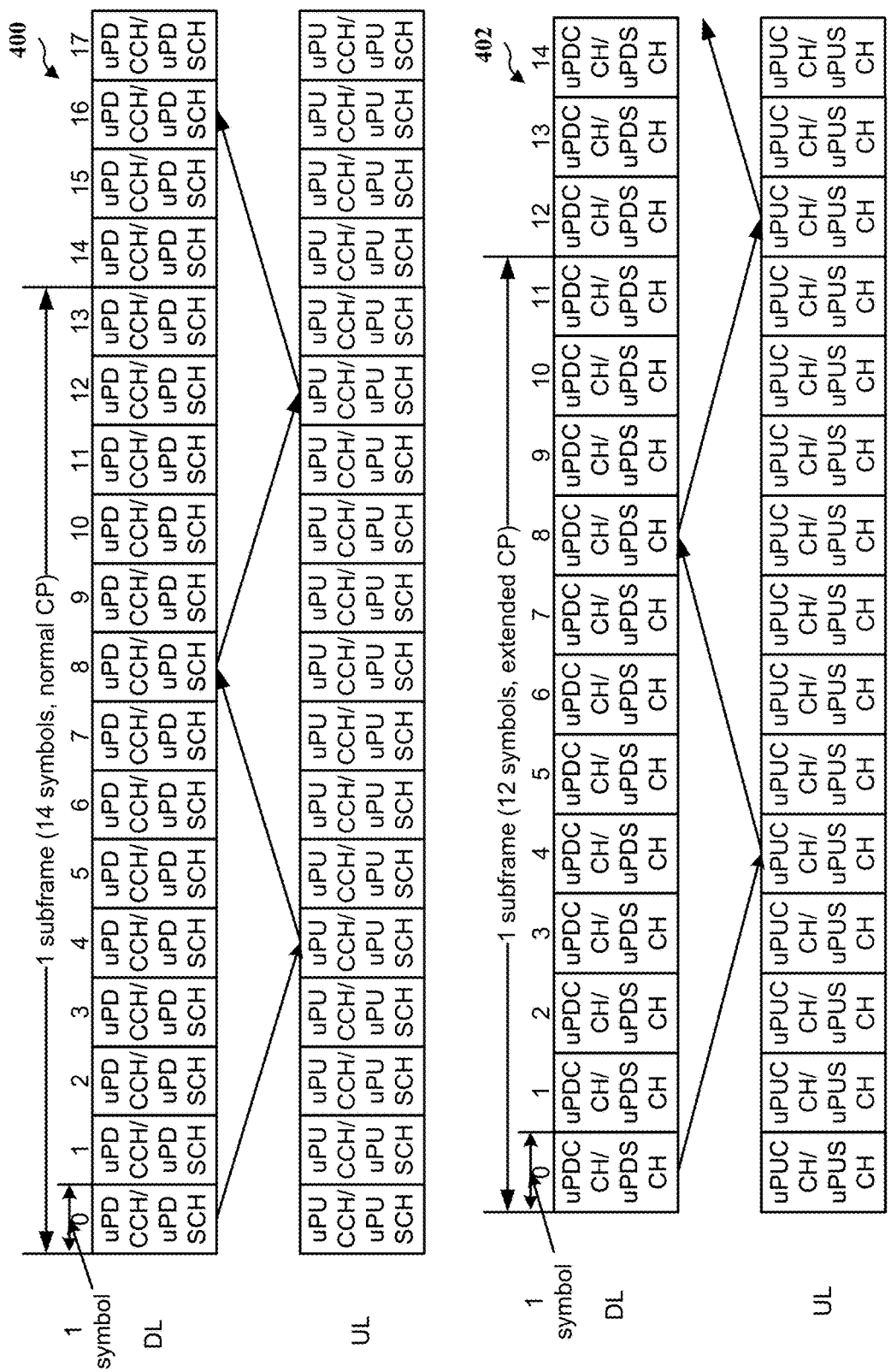
FIG. 4 is a diagram illustrating examples of timelines for ultra low latency (ULL) bandwidth allocation.

FIG. 4 is a diagram illustrating non-limiting examples of ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH), also referred to herein as a shortened PDCCH (sPDCCH) and/or ULL physical downlink shared channel (uPDSCH), also referred to herein as a shortened PDSCH (sPDSCH), and symbols representing a TTI including ULL physical uplink control channel (uPUCCH), also referred to herein as a shortened PUCCH (sPUCCH), and/or ULL physical uplink shared channel (uPUSCH), also referred to herein as a shortened PUSCH (sPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols (e.g., two symbols, four symbols, etc.), a slot of a subframe (where a subframe includes two slots), etc. In addition, HARQ process response time can be 3 symbol sTTIs (or 4 symbols, 3 or 4 two-symbol sTTIs, 3 or 4 slot sTTIs, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Figure 5:
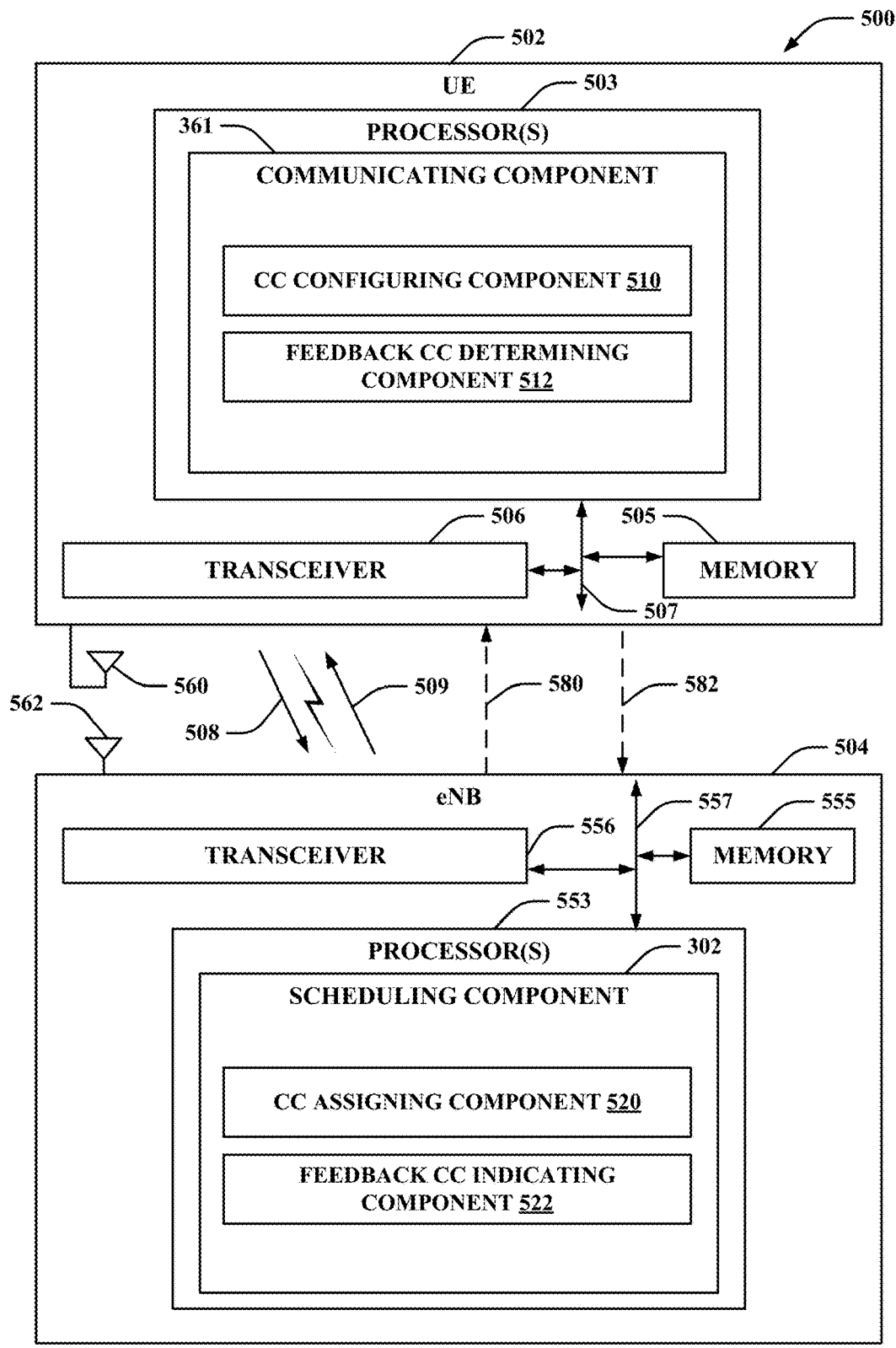
FIG. 5 is a diagram illustrating an example of a system for communicating in a ULL wireless communication technology in accordance with aspects described herein.
Figure 6:
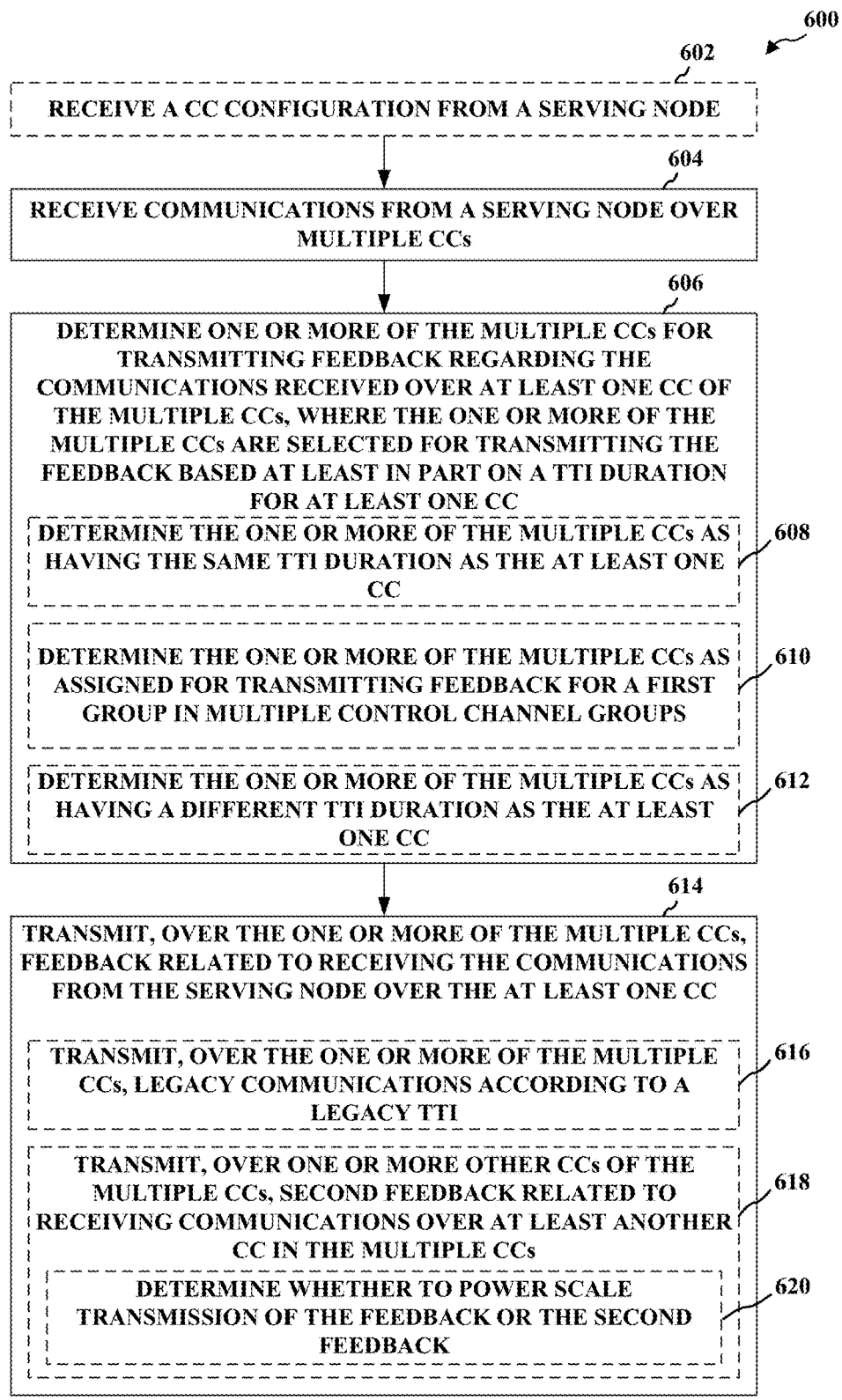
FIG. 6 is a flow chart of an example of a method for transmitting feedback in a ULL wireless communication technology in accordance with aspects described herein.
Figure 7:
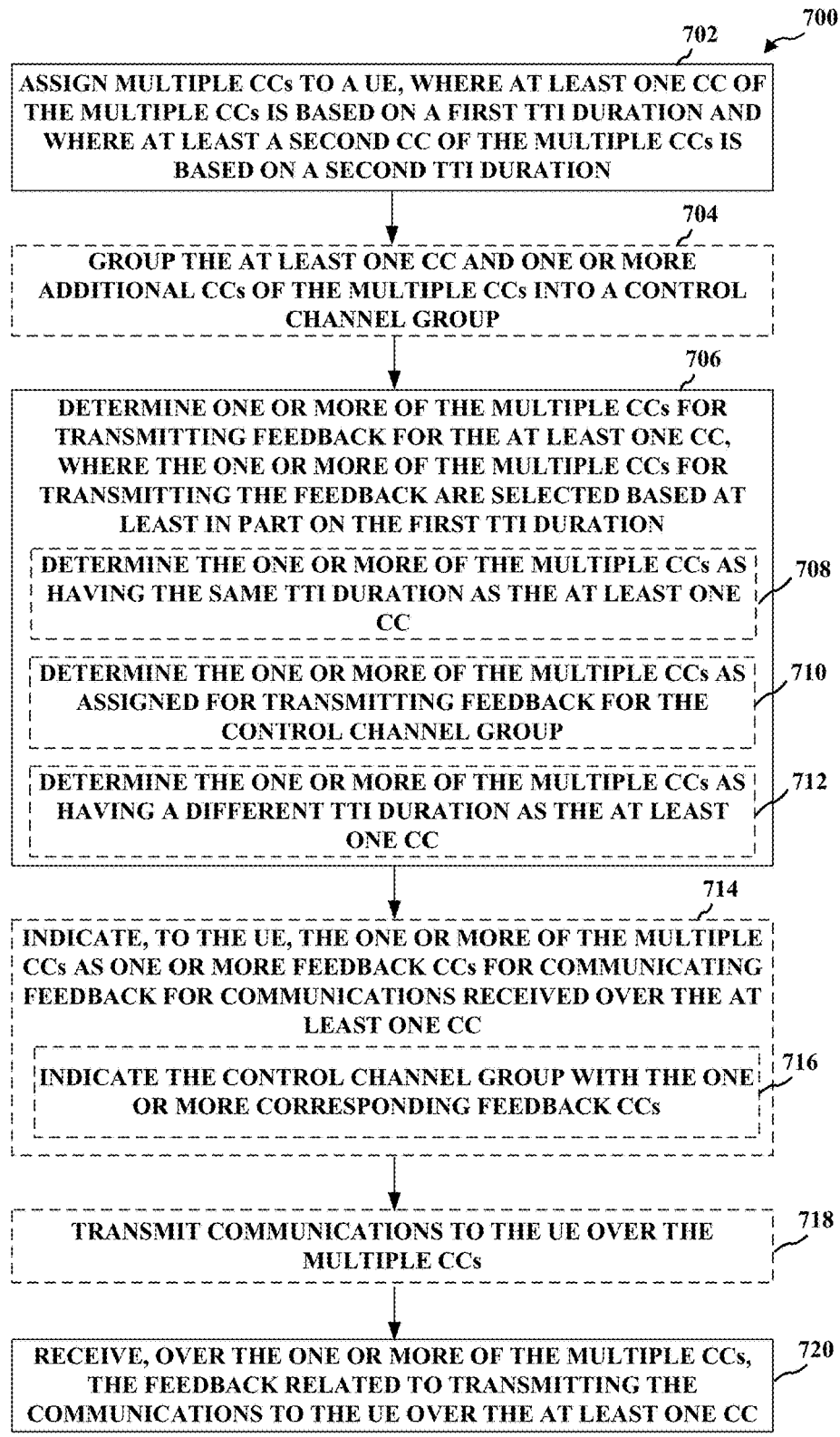
FIG. 7 is a flow chart of an example of a method for receiving feedback in a ULL wireless communication technology in accordance with aspects described herein.

Referring to FIGS. 5-7, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 5 illustrates an example of a system 500 for scheduling ULL communications. System 500 includes a UE 502 that communicates with an eNB 504 to access a wireless network, examples of which are described in FIGS. 1-3 (e.g., access points 105, eNB 204, small cell eNB 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. As described further herein, for example, eNB 504 may communicate a configuration 580 related to establishing multiple CCs for communicating with eNB 504 and/or other eNBs in carrier aggregation or multiple connectivity. For example, the configuration 580 (or a separate configuration) may include an indication of one or more feedback CCs for transmitting feedback for communications received over the multiple CCs. UE 502 can accordingly communicate feedback 582 over the one or more feedback CCs to eNB 504.

In an aspect, UE 502 may include one or more processors 503 and/or a memory 505 that may be communicatively coupled, e.g., via one or more buses 507, and may operate in conjunction with or otherwise implement a communicating component 361 for receiving an assignment of the multiple CCs from one or more eNBs (e.g., configuration 580 from eNB 504), and/or the indication of the one or more of the multiple CCs as the feedback CC(s) for communicating feedback corresponding to at least a portion of the multiple CCs. For example, the various operations related to communicating component 361 may be implemented or otherwise executed by one or more processors 503 and, in an aspect, can be executed by a single processor, while in other aspects, different ones of the operations may be executed by a combination of two or more different processors.

For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a CC configuring component 510 for establishing multiple CCs with one or more eNBs, which may be based on a received configuration. In an aspect, for example, CC configuring component 510 may include hardware (e.g., one or more processor modules of the one or more processors 503) and/or computer-readable code or instructions stored in memory 505 and executable by at least one of the one or more processors 503 to perform the specially configured CC establishing operations described herein. Further, for instance, the one or more processors 503 and/or memory 505 may execute actions or operations defined by a feedback CC determining component 512 for determining one or more of the multiple CCs as one or more feedback CCs to utilize in communicating feedback, where the feedback relates to communications received over at least one of the multiple CCs. In an aspect, for example, feedback CC determining component 512 may include hardware (e.g., one or more processor modules of the one or more processors 503) and/or computer-readable code or instructions stored in memory 505 and executable by at least one of the one or more processors 503 to perform the specially configured feedback CC determining operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for assigning multiple CCs to one or more UEs, such as UE 502, for communicating with the eNB 504 (and/or other eNBs) in carrier aggregation or multiple connectivity, and/or communicating an indication of one or more of the multiple CCs as feedback CC(s) for communicating feedback corresponding to at least a portion of the multiple CCs. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a CC assigning component 520 for generating and/or communicating a configuration indicating multiple CCs to be established at the UE 502 (e.g., with the eNB 504 and/or other eNBs) for communicating in a wireless network. In an aspect, for example, CC assigning component 520 may include hardware (e.g., one or more processor modules of the one or more processors 553) and/or computer-readable code or instructions stored in memory 555 and executable by at least one of the one or more processors 553 to perform the specially configured CC configuring operations described herein. Further, for instance, the one or more processors 553 and/or memory 555 may execute actions or operations defined by a feedback CC indicating component 522 for indicating one or more of the multiple CCs as feedback CC(s) for communicating feedback related to communications received over at least one of the multiple CCs. In an aspect, for example, feedback CC indicating component 522 may include hardware (e.g., one or more processor modules of the one or more processors 553) and/or computer-readable code or instructions stored in memory 555 and executable by at least one of the one or more processors 553 to perform the specially configured feedback CC indicating operations described herein.

In an example, transceivers 506, 556 may be configured to transmit and receive wireless signals through one or more antennas 560, 562, one or more RF front end components (e.g., a power amplifier, low-noise amplifier, a filter, a digital-to-analog converter, an analog-to-digital converter, etc., not shown), one or more transmitters, one or more receivers, etc. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels (e.g., via one or more antennas 560, 562).

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

FIG. 6 illustrates an example method 600 for communicating (e.g., by a UE) feedback for communications received over multiple CCs that may utilize different TTI/sTTI durations. In FIG. 6, blocks shown in dashed boxes may be optional.

At Block 602, the UE can optionally receive a CC configuration from a serving node. In an aspect, CC configuring component 510, e.g., in conjunction with processor(s) 503, memory 505, and/or transceiver 506, can receive the CC configuration (e.g., configuration 580) from the serving node (e.g., eNB 504). For example, the CC configuration may indicate multiple CCs to be established between UE 502 and one or more eNBs, which may include eNB 504, for transmitting or receiving wireless communications. One or more of the multiple CCs can be configured to utilize a different TTI/sTTI, such that at least one CC utilizes one TTI/sTTI (e.g., a TTI/sTTI of a 1 ms, one symbol, two symbol, four symbol, one slot, etc. duration) and at least another CC utilizes a different TTI/sTTI. Thus, for example, the multiple CCs may be used to communicate over one or more uplink and/or downlink channels (e.g., PUCCH, PUSCH, PDCCH, PDSCH or sPUCCH, sPUSCH, sPDCCH, sPDSCH, depending on the TTI/sTTI configured for each of the CCs). In another example, the UE 502 may additionally or alternatively receive other information from which the CC configuration can be determined, where the information may be received in a configuration stored in memory 505, received from one or more other eNBs or network nodes, etc. Moreover, in an example, the UE 502 and eNB 504 can establish an initial CC (e.g., a primary CC (PCC) or anchor CC) based on the UE 502 requesting access to a wireless network via eNB 504 (e.g., by using a random access channel procedure (RACH)), and the UE 502 may receive the CC configuration for the remaining CCs from the eNB 504 over the PCC.

In one specific example, the CC configuration can specify one or more downlink/uplink sTTI combinations for one or more CCs. For example, the CC configuration can specify one or more CCs including a two symbol downlink CC and a two symbol uplink CC. In another example, the CC configuration can specify one or more CCs including a one slot downlink CC and a one slot uplink CC. In another example, the CC configuration can specify one or more CCs including a two symbol downlink CC and a one slot uplink CC, etc. In one example, CCs assigned in a group (e.g., in a control channel group) may have the same sTTI duration or it may be possible that CCs assigned in the same group are of different sTTI durations, as described further herein.

In any case, CC configuring component 510 can establish the multiple CCs with the one or more eNBs. For example, this may include establishing the PCC with eNB 504 based on performing a RACH procedure therewith, establishing the remaining CCs as received in configuration 580 over the PCC, establishing all CCs based on a configuration received from memory 505, from eNB 504 or other eNBs/network components, etc. In one example, the CC configuration received from the serving node may also indicate information for transmitting feedback for communications received over the CCs, such as a timing for transmitting feedback, one or more CCs to utilize in transmitting feedback for the configured CCs, etc. In this example, feedback CC determining component 512 may determine the one or more CCs to utilize in transmitting the feedback based on the CC configuration, as described further herein.

At Block 604, the UE can receive communications from a serving node over multiple CCs. In an aspect, communicating component 361, e.g., in conjunction with processor(s) 503, memory 505, and/or transceiver 506, can receive the communications from the serving node (e.g., eNB 504) over the multiple CCs. In an example, the multiple CCs can include those indicated in the CC configuration, if received at Block 602. For example, communicating component 361 may receive the communications based on different TTI/sTTI durations over the multiple CCs, as described, which may include receiving communications over one or more downlink channels (e.g., PDCCH, PDSCH based on a 1 ms TTI, sPDCCH, sPDSCH based on an sTTI, etc.).

Accordingly, at Block 606, the UE can determine one or more of the multiple CCs for transmitting feedback regarding the communications received over at least one CC of the multiple CCs, where the one or more of the multiple CCs are selected for transmitting the feedback based at least in part on a TTI duration for the at least one CC. In an aspect, feedback CC determining component 512, e.g., in conjunction with processor(s) 503, memory 505, and/or transceiver 506, can determine one or more of the multiple CCs for transmitting feedback regarding the communications received over at least one CC of the multiple CCs, where the one or more of the multiple CCs are selected for transmitting the feedback based at least in part on a TTI duration for the at least one CC. For example, feedback CC determining component 512 can determine the one or more of the multiple CCs as one or more feedback CCs for transmitting the feedback where the one or more of the multiple CCs utilize the same or different TTI duration as the at least one CC for which feedback is being reported. In another example, feedback CC determining component 512 can determine the one or more of the multiple CCs as one or more feedback CCs based on determining a control channel group configured for reporting feedback related to the at least one CC, as described further herein. In an example, eNB 504 can select and/or configure (for the UE 502) the one or more feedback CCs for the at least one CC, as described further herein (e.g., with respect to FIG. 7), or the UE 502 may select and/or configure the one or more feedback CCs for the at least one CC (e.g., based on determining TTI/sTTI duration of the one or more feedback CCs).

In an example, in determining the one or more of the multiple CCs at Block 606, the UE may optionally, at Block 608, determine the one or more of the multiple CCs as having the same TTI duration as the at least one CC. In an aspect, feedback CC determining component 512, e.g., in conjunction with processor(s) 503, memory 505, and/or transceiver 506, can determine the one or more of the multiple CCs as having the same TTI duration as the at least one CC. As described, feedback CC determining component 512 may determine the one or more of the multiple CCs based at least in part on an assignment of one or more feedback CCs for the at least one CC received from the eNB 504 (e.g., in configuration 580), based at least in part on determining that the one or more of the multiple CCs have a same TTI/sTTI duration as the at least one CC, etc. In any case, for example, communicating component 361 can configure the one or more of the multiple CCs (the feedback CCs) for reporting feedback for communications received over the at least one CC (e.g., received over a PDCCH, sPDCCH, PDSCH, sPDSCH) so that there is no cross-TTI/sTTI HARQ feedback operation among the multiple CCs.

In other words, where 1 ms TTI transmissions are received over the at least one CC, feedback CC determining component 512 can determine the one or more feedback CCs that are CC(s) over which PUCCH/PUSCH can be transmitted based on the 1 ms TTI to report the feedback. For example, feedback CC determining component 512 can determine the feedback CCs based on a received configuration and/or based on determining that the feedback CCs utilize the same duration TTI (1 ms) as the at least one CC. In another example, where one symbol TTI transmissions are received over the at least one CC, feedback CC determining component 512 can determine the one or more feedback CCs that are CC(s) over which sPUCCH/sPUSCH can be transmitted based on the one symbol TTI to report the feedback. For example, feedback CC determining component 512 can determine the feedback CCs based on a received configuration and/or based on determining that the feedback CCs utilize the same duration TTI (one symbol) as the at least one CC. Similarly, where two symbol TTI transmissions are received over the at least one CC, feedback CC determining component 512 can determine the one or more feedback CCs that are CC(s) over which sPUCCH/sPUSCH can be transmitted based on the two symbol TTI to report the feedback. For example, feedback CC determining component 512 can determine the feedback CCs based on a received configuration and/or based on determining that the feedback CCs utilize the same duration TTI (two symbol) as the at least one CC. In yet another example, where two symbol TTI transmissions are received over the at least one CC, feedback CC determining component 512 can determine the one or more feedback CCs that are CC(s) over which sPUCCH/sPUSCH can be transmitted based on a four symbol TTI to report the feedback e.g., to improve coverage of the feedback CCs). In yet another example, where one slot TTI transmissions are received over the at least one CC, feedback CC determining component 512 can determine the one or more feedback CCs that are CC(s) over which sPUCCH/sPUSCH can be transmitted based on the one slot TTI to report the feedback. For example, feedback CC determining component 512 can determine the feedback CCs based on a received configuration and/or based on determining that the feedback CCs utilize the same duration TTI (one slot) as the at least one CC.

In another example, in determining the one or more of the multiple CCs at Block 606, the UE may optionally, at Block 610, determine the one or more of the multiple CCs as assigned for transmitting feedback for a first group in multiple control channel groups. In an aspect, feedback CC determining component 512, e.g., in conjunction with processor(s) 503, memory 505, and/or transceiver 506, can determine the one or more of the multiple CCs, as one or more feedback CCs assigned for transmitting feedback for the first group in the multiple control channel groups. As described, for example, eNB 504 may configure multiple control channel groups for the UE 502 for reporting feedback, where one or more of the multiple CCs can each be assigned to at least one control channel group. Each control channel group can correspond to one or more feedback CCs over which to transmit feedback, over a control channel, for the CCs in the control channel group. Thus, for example, UE 502 can transmit feedback for communications received over each CC in a control channel group by using the associated one or more feedback CC(s) to transmit the feedback over the corresponding control channel (e.g., a PUCCH, sPUCCH depending on the TTI/sTTI of the feedback CC(s), or PUSCH, sPUSCH in some cases where PUCCH, sPUCCH is not used).

As described further herein, for example, the eNB 504 may organize the set of CCs in a PUCCH group (e.g., in carrier aggregation or multiple connectivity) based on supported TTI/sTTI duration for each of the CCs. For example, the eNB 504 can configure the UE with carrier aggregation with two PUCCH groups, and for each group, the eNB 504 may organize the set of CCs in the PUCCH group (e.g., into one or more subgroups) based on the TTI/sTTI durations supported. The eNB 504 may indicate the organization of the CCs into the groups and/or subgroups in configuration 580, for example. Additionally or alternatively, the PUCCH grouping can be different from sPUCCH grouping. For example, given 5 CCs (CC1, CC2, CC3, CC4, CC5), eNB 504 may assign two PUCCH (e.g., 1 ms TTI) groups with CC1/CC2 in a first group, CC3/CC4/CC5 in a second group, and a sPUCCH group for one slot TTI with CC2/CC4/CC5, where CC2, CC4, and CC5 can support 1 ms and one slot TTIs, but CC1 and CC3 may support only 1 ms TTI. In any case, the eNB 504 can indicate a configuration 580 of one or more feedback CCs to the at least one CC (e.g., based on a control channel group or otherwise), and feedback CC determining component 512 can determine the one or more feedback CCs for the at least one CC based on the configuration.

In another example, in determining the one or more of the multiple CCs at Block 606, the UE may optionally, at Block 612, determine the one or more of the multiple CCs as having a different TTI duration as the at least one CC. In an aspect, feedback CC determining component 512, e.g., in conjunction with processor(s) 503, memory 505, and/or transceiver 506, can determine the one or more of the multiple CCs as having a different TTI duration as the at least one CC. As described, feedback CC determining component 512 may determine the one or more of the multiple CCs as having the different TTI duration as the at least one CC based at least in part on an assignment of one or more feedback CCs for the at least one CC received from the eNB 504 (e.g., in configuration 580), or based on determining that the one or more feedback CCs have a TTI/sTTI duration that can accommodate feedback for the at least one CC, etc. In any case, for example, the one or more of the multiple CCs (the feedback CCs) may be configured for reporting feedback for communications received over the at least one CC (e.g., received over a PDCCH, sPDCCH, PDSCH, sPDSCH) so that there is cross-TTI/sTTI HARQ feedback operation.

For example, for the at least one CC, feedback CC determining component 512 may determine the one or more of the multiple CCs as having a longer TTI than that of the at least one CC (or vice versa). For example, the HARQ feedback timing can be based on each respective TTI/sTTI duration. In one specific example, feedback CC determining component 512 may determine the one or more of the multiple CCs as having a 1 ms TTI for transmitting PUCCH/PUSCH to handle feedback for 1 ms and one slot TTI traffic received over the at least one CC (e.g., PUCCH/PUSCH of subframe n can be used to communicate feedback for 1 ms traffic 4 ms or earlier and one slot traffic four slots or earlier). In another specific example, feedback CC determining component 512 may determine the one or more of the multiple CCs as having a one slot TTI for transmitting sPUCCH/sPUSCH to handle feedback for one slot and 1 ms TTI traffic received over the at least one CC (e.g., one slot sPUCCH/sPUSCH of slot n can be used to communicate feedback for one slot traffic four slots earlier, or 1 ms traffic 4 ms (or eight slots) earlier). In another specific example, feedback CC determining component 512 may determine the one or more of the multiple CCs as having a one slot sTTI for transmitting sPUCCH/sPUSCH to handle feedback for two symbol sTTI traffic received over the at least one CC. As described, feedback CC determining component 512 may determine the one or more of the multiple CCs based on the TTI/sTTI duration and/or based on a CC configuration (e.g., configuration 580) or other configuration parameters received from the eNB 504.

In another example, described further herein, the eNB 504 can enforce TTI/sTTI restrictions among CCs configured in a control channel group to ensure that the CCs support the same TTI/sTTI durations, which may include supporting one ULL duration (e.g., one symbol, two symbol, or one slot) and a 1 ms TTI to allow for communicating broadcast data and unicast scheduled by downlink control information (DCI) in a common search space (CSS). In this regard, for example, configuration of the sTTI can be done by the eNB 504 on a per UE basis (e.g., instead of per CC basis). As described, feedback CC determining component 512 can determine the feedback CC(s) for the at least one CC based on the configuration 580 received from eNB 504 or other network components, which may indicate the CCs of the ULL duration and the 1 ms TTI duration, the associated feedback CCs, and/or the like. In another example, feedback CC determining component 512 may determine the associated feedback CCs based on determining associated TTI/sTTI durations of the assigned uplink CCs that can accommodate feedback from the downlink CCs using one or more of the mechanisms described above for Blocks 606, 608, 610, 612.

At Block 614, the UE can transmit, over the one or more of the multiple CCs, feedback related to receiving the communications from the serving node over the at least one CC. In an aspect, communicating component 361, e.g., in conjunction with processor(s) 503, memory 505, and/or transceiver 506, can transmit, over the one or more of the multiple CCs, feedback (e.g., feedback 582) related to receiving the communications from the serving node (e.g., eNB 504) over the at least one CC. For example, the feedback may include HARQ feedback, such as an ACK indicating the communications were received over the at least one CC or a NACK indicating the communications were not received (or not properly received or decoded) over the at least one CC. In an example, transmitting the feedback 582 can be according to the TTI/sTTI configured for the one or more feedback CC(s) (which, for example, may be the same or different as the TTI/sTTI configured for the at least one CC).

In one example, in transmitting the feedback at Block 614, the UE may also optionally, at Block 616, transmit, over the one or more of the multiple CCs, legacy communications according to a legacy TTI. In an aspect, communicating component 361, e.g., in conjunction with processor(s) 503, memory 505, and/or transceiver 506, can transmit, over the one or more of the multiple CCs, the legacy communications according to the legacy TTI (e.g., a 1 ms TTI). In one example, where the one or more of the multiple CCs (the feedback CC(s)) are used to communicate feedback for ULL communications (e.g., received over the at least one carrier according to an sTTI), the one or more of the multiple CCs may also be used to communicate legacy control or data to the eNB 504 to allow for communicating broadcast data, unicast data scheduled by DCI in a CSS, etc.

In another example, in transmitting the feedback at Block 614, the UE may also optionally, at Block 618, transmit, over one or more other CCs of the multiple CCs, second feedback related to receiving communications over another CC in the multiple CCs. In an aspect, communicating component 361, e.g., in conjunction with processor(s) 503, memory 505, and/or transceiver 506, can transmit, over the one or more other CCs of the multiple CCs, the second feedback related to receiving communications over at least another CC in the multiple CCs. In one example, the one or more other CCs, as other feedback CC(s), may utilize a different TTI/sTTI than the feedback CC(s) for transmitting the initial feedback (e.g., at Block 614). Transmitting of the feedback and the second feedback, in one example, may occur in parallel. Thus, parallel sPUCCH, PUCCH, sPUSCH, and PUSCH transmissions may be possible (e.g., PUCCH, one slot sPUCCH, two symbol sPUCCH, four symbol sPUCCH, etc.). In an example, the UE may support parallel PUCCH and PUSCH capability in this regard. If the UE is not capable of supporting parallel PUCCH and PUSCH, for example, transmitting the feedback and the second feedback may include communicating component 361 transmitting the feedback and the second feedback (e.g., regardless of whether for 1 ms TTI or sTTI traffic) along with data over a sPUSCH channel (e.g., on a feedback CC that supports sTTI) or a PUSCH channel (e.g., on a feedback CC that supports 1 ms TTI).

Additionally, in transmitting the second feedback at Block 618, the UE may optionally, at Block 620, determine whether to power scale transmission of the feedback or the second feedback. In an aspect, communicating component 361, e.g., in conjunction with processor(s) 503, memory 505, and/or transceiver 506, can determine whether to power scale transmission of the feedback or the second feedback (and may accordingly scale the power for the transmission). In a specific example, communicating component 361 may determine to power scale transmission of the feedback, which may relate to 1 ms traffic, due to addition of a CC that supports a one slot TTI.

FIG. 7 illustrates an example method 700 for assigning (e.g., by an eNB) multiple CCs for wireless communication. In FIG. 7, blocks shown in dashed boxes may be optional.

At Block 702, the eNB can assign multiple CCs to a UE, where at least one CC of the multiple CCs is based on a first TTI duration and where at least a second CC of the multiple CCs is based on a second TTI duration. In an aspect, CC assigning component 520, e.g., in conjunction with processor(s) 553, memory 555, and/or transceiver 556, can assign the multiple CCs to the UE (e.g., UE 502), where the at least one CC of the multiple CCs is based on a first TTI duration (e.g., TTI/sTTI) and where at least a second CC of the multiple CCs is based on a second TTI duration. As described, for example, CC assigning component 520 may assign a first CC as a PCC, which may be based on UE 502 performing a RACH procedure with eNB 504, and CC assigning component 520 may assign additional CCs over a control channel established on the PCC (e.g., by transmitting a configuration 580). An example CC assignment is shown in FIG. 8

Figure 8:
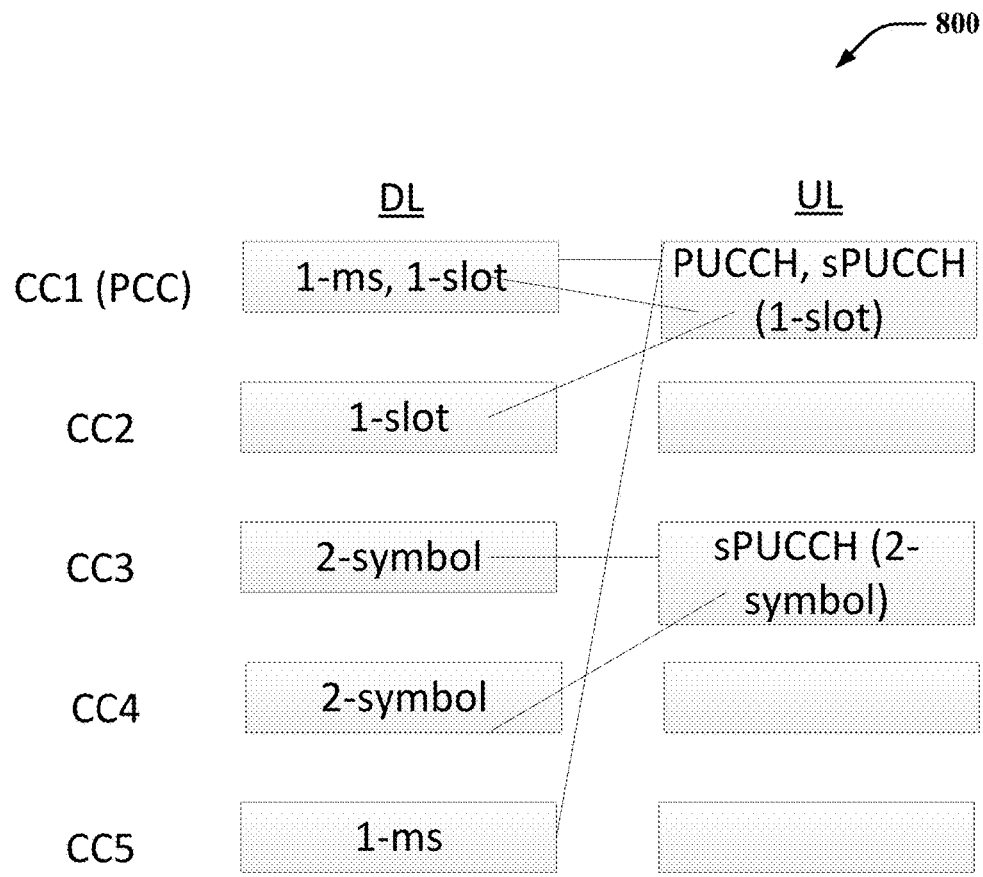
FIG. 8 is a diagram of an example of a component carrier (CC) assignment where feedback for the CCs is transmitted over a CC selected based on duration of a transmission time interval (TTI) of the CCs in accordance with aspects described herein.

FIG. 8 illustrates an example of a CC assignment 800 including 5 CCs, where CC1 is configured for 1 ms TTI and one slot sTTI, CC2 is configured for one slot sTTI, CC3 is configured for two symbol sTTI, CC4 is configured for two symbol sTTI, and CC5 is configured for 1 ms TTI. The UE 502 can accordingly receive downlink communications from the eNB based on the TTI(s)/sTTI(s) corresponding to each CC. In addition, the UE 502 can transmit uplink communications (e.g., feedback or other control or data) over one or more of the CCs based on the supported TTI(s)/sTTI(s).

Referring back to FIG. 7, at Block 704, the eNB may optionally group the at least one CC and one or more additional CCs of the multiple CCs into a control channel group. In an aspect, CC assigning component 520, e.g., in conjunction with processor(s) 553, memory 555, and/or transceiver 556, can group the at least one CC and one or more additional CCs of the multiple CCs into a control channel group. For example, the control channel group can include the CCs which are to be associated with a common CC (or set of CCs) for reporting feedback for communications received over the CCs in the control channel group. Referring back to FIG. 8, in one example, CC assigning component 520 may group CC1, CC2, and CC5 in a control channel group for reporting feedback over CC1, and may group CC3 and CC4 into a control channel group for reporting feedback over CC3. In this specific example, grouping may be based on the CCs having similar supported TTIs to one of the other CCs. In any case, CC assigning component 520 can associate a group of CCs in a control channel group, or otherwise associate of one or more CCs to one or more feedback CCs based on one or more of the concepts described below.

At Block 706, the eNB may determine one or more of the multiple CCs for transmitting feedback for the at least one CC, where the one or more of the multiple CCs for transmitting the feedback are selected based at least in part on the first TTI duration. In an aspect, CC assigning component 520, e.g., in conjunction with processor(s) 553, memory 555, and/or transceiver 556, can determine one or more of the multiple CCs, as one or more feedback CCs, for transmitting feedback for the at least one CC, where the one or more of the multiple CCs for transmitting the feedback are selected based at least in part on the first TTI duration. For example, CC assigning component 520 can determine (e.g., select) the feedback CC(s) based on a same or different TTI between the feedback CC(s) and the at least one CC configured for the UE, can determine the feedback CC(s) for a control channel group of CCs, etc., and can indicate the feedback CC(s) to the UE 502, as described further herein. In another example, as described, the UE 502 may select the feedback CC(s) based on the CCs configured by the eNB 504 and associated TTI/sTTI durations, as described above.

Thus, in an example, in determining the one or more of the multiple CCs for transmitting feedback, the eNB may optionally, at Block 708, determine the one or more of the multiple CCs as having the same TTI duration as the at least one CC. In an aspect, CC assigning component 520, e.g., in conjunction with processor(s) 553, memory 555, and/or transceiver 556, can determine the one or more of the multiple CCs, as the one or more feedback CCs, as having the same TTI duration as the at least one CC. For example, CC assigning component 520 determine the feedback CC(s) for each of the multiple CCs in this regard. In a specific example, CC assigning component 520 may determine the PCC as one feedback CC and may associate the PCC with any of the multiple CCs that support the same TTI(s)/sTTI(s) as the PCC. For example, referring to FIG. 8, CC assigning component 520 may associate CC1, CC2, and CC5, which all support 1 ms and/or one slot TTIs, to CC1 for communicating feedback for communications received over CC1, CC2, or CC5, as CC1 supports 1 ms and one slot TTIs. Similarly, in this example, CC assigning component 520 may associate CC3 and CC4, which support two symbol TTI, with CC3 (e.g., the first indexed CC that supports two symbol TTI) for transmitting feedback for communications received over CC3 or CC4. In this example, CC assigning component 520 can assign the feedback CCs such that there is no cross-TTI/sTTI between feedback CCs and the CCs assigned for receiving communications for which feedback is to be reported. In one specific example, CC assigning component 520 may associate a downlink CC having a two symbol TTI with an uplink CC also having a two symbol TTI for transmitting feedback. In another specific example, CC assigning component 520 may associate a downlink CC having a one slot TTI with an uplink CC also having a one slot TTI for transmitting feedback. In another specific example, CC assigning component 520 may associate a downlink CC having a two symbol TTI with an uplink CC having a one slot TTI for transmitting feedback, etc.

In another example, in determining the one or more of the multiple CCs for transmitting feedback, the eNB may optionally, at Block 710, determine the one or more of the multiple CCs as assigned for transmitting feedback for the control channel group. In an aspect, CC assigning component 520, e.g., in conjunction with processor(s) 553, memory 555, and/or transceiver 556, can determine the one or more of the multiple CCs as assigned for transmitting feedback for the control channel group. As described, CC assigning component 520 can group the CCs into control channel groups, which may be based on determining the CCs in the group as supporting the same TTI(s)/sTTI(s). Specifically, for example in FIG. 8, CC assigning component 520 can create a control channel group for CC1, CC2, and CC5, which can use CC1 to transmit feedback. This may include transmitting PUCCH over CC1 (using 1 ms TTI) for communications received over CC1 (1 ms) and CC5, and transmitting sPUCCH over CC1 (using one slot TTI) for communications received over CC1 (one slot) and CC2. Additionally, CC assigning component 520 can create a control channel group for CC3 and CC4, which can use CC3 to transmit feedback. This may include transmitting sPUCCH over CC3 (using two symbol TTI) for communications received over CC3 and CC4. CC assigning component 520 can assign the control channel groups to use similar feedback CC(s) (e.g., feedback CCs having the same TTI/sTTI as the CCs in the control channel group) for communicating feedback over sPUSCH, PUSCH. Moreover, it is possible that one CC is configured for two or more sTTIs, in which case CC assigning component 520 may group the CC into two or more different control channel groups based on the two or more possible sTTIs.

In another example, in determining the one or more of the multiple CCs for transmitting feedback, the eNB may optionally, at Block 712, determine the one or more of the multiple CCs as having a different TTI duration as the at least one CC. In an aspect, CC assigning component 520, e.g., in conjunction with processor(s) 553, memory 555, and/or transceiver 556, can determine the one or more of the multiple CCs, as the one or more feedback CCs, as having a different TTI duration as the at least one CC. As described, CC assigning component 520 may select the one or more feedback CCs to have a TTI/sTTI duration that is shorter or longer than the TTI of the at least one CC.

In yet another example, in assigning the multiple CCs to the UE at Block 702, the CC assigning component 520 can group the CCs into multiple control channel groups, as described, and can ensure each CC in a given control channel group supports at least one common TTI/sTTI. For example, if a one slot TTI is configured for one CC in a control channel group, other CCs can be assigned to support one slot TTI as well. In one example, the supported TTI(s)/sTTI(s) can be the same or different across all control channel groups as well. In a specific example, CC assigning component 520 can also assign the CCs such that the CCs can additionally support 1 ms TTI for broadcast data, unicast data scheduled by DCI in CSS, etc. Accordingly, for example, the UE 502 can use PUCCH for HARQ feedback of the unicast traffic scheduled by DCI in CSS. In another specific example, CC assigning component 520 may allow 1 ms TTI and one single sTTI (e.g., one slot TTI, two symbol downlink/two symbol uplink TTI, two symbol downlink/four symbol uplink TTI, etc.) for CCs in a given control channel group. An example CC assignment in this example is shown in FIG. 9.

Figure 9:
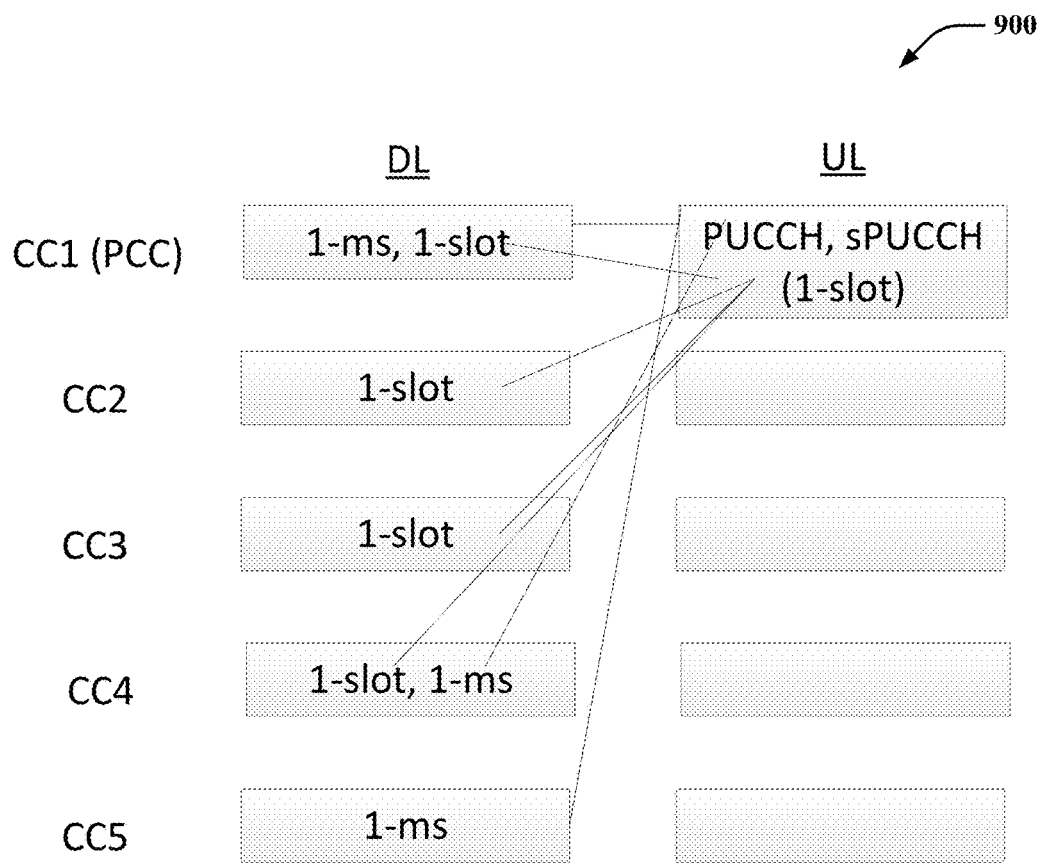
FIG. 9 is a diagram of an example of a component carrier (CC) assignment where feedback for the CCs is transmitted over a CC selected based on grouping of the CCs in accordance with aspects described herein.

FIG. 9 illustrates an example of a CC assignment 900 including 5 CCs, where CC1 is configured for 1 ms and one slot TTI, CC2 is configured for one slot TTI, CC3 is configured for one slot TTI, CC4 is configured for one slot TTI, and CC5 is configured for 1 ms TTI. The UE 502 can accordingly receive downlink communications from the eNB based on the TTI(s)/sTTI(s) corresponding to each CC. In addition, the UE 502 can transmit uplink communications (e.g., feedback or other control or data) over one or more of the CCs based on the supported TTI(s)/sTTI(s). In this example, CC assigning component 520 can assign CC1 as the feedback CC for all CCs, though the TTI duration of CC1 may be different than the TTI/sTTI duration for one or more of the other CCs. In one example, CC assigning component 520 can group all CCs in a control channel group associated with CC1 as the feedback CC, group CC1, CC4, and CC5 for 1 ms TTI with CC1 as the feedback CC for 1 ms PUCCH, and CC1, CC2, CC3, and CC4 for one slot TTI with CC1 as the feedback CC for one slot sPUCCH, etc. In another example, CC assigning component 520 can assign CCs in a control channel group to use certain TTI/sTTI, as described, such as: CC1, CC4, and CC5 in a PUCCH group to support 1 ms TTI and communicate feedback over CC1; CC1 and CC2, which may be in a sPUCCH group, to support one slot sTTI and communicate feedback over CC1; CC3 and CC4 in a sPUCCH group to support one slot sTTI and communicate feedback over CC1, etc. In any case, assigning the multiple CCs at Block 702 may include CC assigning component 520 communicating a configuration 580 indicating the CC assignment and/or associated control channel groups to the UE 502, as described above.

At Block 714, the eNB can optionally indicate, to the UE, the one or more of the multiple CCs as one or more feedback CCs for communicating feedback for communications received over the at least one CC. In an aspect, feedback indicating component 522, e.g., in conjunction with processor(s) 553, memory 555, and/or transceiver 556, can indicate, to the UE (e.g., UE 502), the one or more of the multiple CCs as one or more feedback CCs for communicating feedback for communications received over at least the at least one CC. In one example, this can be provided in configuration 580 as well, or another configuration transmitted to the UE 502 in broadcast or dedicated signaling. Moreover, as described, this can include, at Block 716, indicating the control channel group with the one or more corresponding feedback CCs. In an aspect, CC assigning component 520 and/or feedback indicating component 522, e.g., in conjunction with processor(s) 553, memory 555, and/or transceiver 556, can indicate the control channel group with the one or more corresponding feedback CCs. In other examples, as described, the UE 502 may determine the feedback CCs without receiving indication from the eNB 504, and the eNB 504 can separately determine the feedback CCs over which to expect feedback from the UE 502.

At Block 718, the eNB can optionally transmit communications to the UE over the multiple CCs. In an aspect, scheduling component 302, e.g., in conjunction with processor(s) 553, memory 555, and/or transceiver 556, can transmit the communications (e.g., control or data communications) to the UE over the multiple CCs, as configured by the eNB 504.

At Block 720, the eNB can receive, over the one or more of the multiple CCs, the feedback related to transmitting the communications to the UE over the at least one CC. In an aspect, scheduling component 302, e.g., in conjunction with processor(s) 553, memory 555, and/or transceiver 556, can receive, over the one or more of the multiple CCs, the feedback related to transmitting the communications to the UE 502 over the at least one CC. This may include receiving parallel transmissions of feedback over multiple feedback CCs, receiving feedback over control or data channels (e.g., PUCCH/sPUCCH or PUSCH/sPUSCH), etc., as described above. In an example, eNB 504 can utilize the feedback to determine whether to retransmit communications to the UE 502 over at least a portion of the multiple CCs (e.g., as part of a HARQ process for a given CC for which the feedback is reported).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating feedback for communications received over multiple component carriers (CCs) in wireless communications, comprising:
   receiving the communications from a serving node over the multiple CCs configured in carrier aggregation or multiple connectivity;
   determining one or more of the multiple CCs for transmitting feedback regarding the communications received over at least one CC of the multiple CCs, wherein the one or more of the multiple CCs are selected for transmitting the feedback based at least in part on a transmission time interval (TTI) duration for the at least one CC; and
   transmitting, over the one or more of the multiple CCs, feedback related to receiving the communications from the serving node over the at least one CC,
   wherein the TTI duration for the at least one CC is two symbols and wherein the one or more of the multiple CCs are selected for transmitting the feedback based at least in part on determining that a second TTI duration of the one or more of the multiple CCs is two or four symbols.

2. The method of claim 1, wherein the one or more of the multiple CCs are selected for transmitting the feedback based at least in part on determining that the TTI duration for the at least one CC is the same as the second TTI duration of the one or more of the multiple CCs, and wherein transmitting the feedback is based at least in part on the TTI duration.

3. The method of claim 1, wherein determining the one or more of the multiple CCs for transmitting feedback is based at least in part on determining the one or more of the multiple CCs as assigned for transmitting feedback for a first group in multiple control channel groups, wherein the at least one CC is assigned to the first group.

4. The method of claim 3, wherein one or more additional CCs of the multiple CCs are assigned to the first group based on having a same TTI duration as the at least one CC, and wherein another portion of the multiple CCs are assigned to a second group in the multiple control channel groups based on having a second same TTI duration.

5. The method of claim 4, wherein the TTI duration is less than a duration of a subframe, wherein the second same TTI duration is the duration of the subframe, and wherein transmitting the feedback includes transmitting the feedback in a low latency control channel over the one or more of the multiple CCs.

6. The method of claim 1, wherein determining the one or more of the multiple CCs for transmitting feedback includes determining the one or more of the multiple CCs associated with a different TTI duration than the TTI duration of the at least one CC.

7. The method of claim 1, wherein the one or more of the multiple CCs are assigned to a control channel group, wherein the control channel group includes the at least one CC and one or more additional CCs, and wherein the at least one CC and the one or more additional CCs are configured to receive communications based on the TTI duration.

8. The method of claim 7, wherein the control channel group is a physical uplink control channel (PUCCH) group, and wherein the one or more of the multiple CCs are configured to transmit feedback using both of a subframe TTI duration and the TTI duration, wherein the TTI duration is less than the subframe TTI duration.

9. The method of claim 1, further comprising:
   determining one or more other CCs of the multiple CCs for transmitting second feedback regarding the communications received over at least the second CC, wherein the one or more other CCs are selected for transmitting the second feedback based at least in part on determining a third TTI duration for at least a second CC in the multiple CCs; and
   transmitting, over the one or more other CCs and in parallel with transmitting feedback over the one or more CCs, the second feedback related to receiving the communications from the serving node over at least the second CC.

10. The method of claim 9, further comprising determining at least one of whether to power scale the feedback when transmitting the feedback based at least in part on the TTI duration or whether to power scale the second feedback when transmitting the second feedback based at least in part on the third TTI duration.

11. The method of claim 1, wherein transmitting the feedback includes transmitting the feedback and second feedback corresponding to at least another CC in the multiple CCs having a different TTI duration in a shared data channel along with data over the one or more of the multiple CCs based on the TTI duration.

12. The method of claim 11, wherein the shared data channel is a physical uplink shared channel (PUSCH).

13. The method of claim 11, wherein the TTI duration is less than a subframe duration and the shared data channel is a low latency physical uplink shared channel.

14. An apparatus for communicating feedback for communications received over multiple component carriers (CCs) in wireless communications, comprising:
a transceiver for communicating one or more wireless signals via one or more antennas;
a memory configured to store instructions; and
one or more processors communicatively coupled with the transceiver and the memory, wherein the one or more processors are configured to:
receive the communications from a serving node over the multiple CCs configured in carrier aggregation or multiple connectivity;
determine one or more of the multiple CCs for transmitting feedback regarding the communications received over at least one CC of the multiple CCs, wherein the one or more of the multiple CCs are selected for transmitting the feedback based at least in part on a transmission time interval (TTI) duration for the at least one CC; and
transmit, over the one or more of the multiple CCs, feedback related to receiving the communications from the serving node over the at least one CC,
wherein the TTI duration for the at least one CC is two symbols and wherein the one or more of the multiple CCs are selected for transmitting the feedback based at least in part on determining that a second TTI duration of the one or more of the multiple CCs is two or four symbols.

15. The apparatus of claim 14, wherein the one or more of the multiple CCs are selected for transmitting the feedback based at least in part on determining that the TTI duration for the at least one CC is the same as the second TTI duration of the one or more of the multiple CCs, and wherein the one or more processors are configured to transmit the feedback based at least in part on the TTI duration.

16. The apparatus of claim 14, wherein the one or more processors are configured to determine the one or more of the multiple CCs for transmitting feedback is based at least in part on determining the one or more of the multiple CCs as assigned for transmitting feedback for a first group in multiple control channel groups, wherein the at least one CC is assigned to the first group.

17. The apparatus of claim 16, wherein one or more additional CCs of the multiple CCs are assigned to the first group based on having a same TTI duration as the at least one CC, and wherein another portion of the multiple CCs are assigned to a second group in the multiple control channel groups based on having a second same TTI duration.

18. The apparatus of claim 17, wherein the TTI duration is less than a duration of a subframe, wherein the second same TTI duration is the duration of the subframe, and wherein the one or more processors are configured to transmit the feedback in a low latency control channel over the one or more of the multiple CCs.

19. The apparatus of claim 14, wherein the one or more processors are configured to determine the one or more of the multiple CCs for transmitting feedback as associated with a different TTI duration than the TTI duration of the at least one CC.

20. The apparatus of claim 14, wherein the one or more of the multiple CCs are assigned to a control channel group, wherein the control channel group includes the at least one CC and one or more additional CCs, and wherein the at least one CC and the one or more additional CCs are configured to receive communications based on the TTI duration.

21. The apparatus of claim 20, wherein the control channel group is a physical uplink control channel (PUCCH) group, and wherein the one or more of the multiple CCs are configured to transmit feedback using both of a subframe TTI duration and the TTI duration, wherein the TTI duration is less than the subframe TTI duration.

22. The apparatus of claim 14, wherein the one or more processors are further configured to:
determine one or more other CCs of the multiple CCs for transmitting second feedback regarding the communications received over at least the second CC, wherein the one or more other CCs are selected for transmitting the second feedback based at least in part on determining a third TTI duration for at least a second CC in the multiple CCs; and
transmit, over the one or more other CCs and in parallel with transmitting feedback over the one or more CCs, the second feedback related to receiving the communications from the serving node over at least the second CC.

23. The apparatus of claim 22, wherein the one or more processors are further configured to determine at least one of whether to power scale the feedback when transmitting the feedback based at least in part on the TTI duration or whether to power scale the second feedback when transmitting the second feedback based at least in part on the third TTI duration.

24. The apparatus of claim 14, wherein the one or more processors are configured to transmit the feedback and second feedback corresponding to at least another CC in the multiple CCs having a different TTI duration in a shared data channel along with data over the one or more of the multiple CCs based on the TTI duration.

25. The apparatus of claim 24, wherein the shared data channel is a physical uplink shared channel (PUSCH).

26. The apparatus of claim 24, wherein the TTI duration is less than a subframe duration and the shared data channel is a low latency physical uplink shared channel.

27. An apparatus for communicating feedback for communications received over multiple component carriers (CCs) in wireless communications, comprising:
means for receiving the communications from a serving node over the multiple CCs configured in carrier aggregation or multiple connectivity;
means for determining one or more of the multiple CCs for transmitting feedback regarding the communications received over at least one CC of the multiple CCs, wherein the one or more of the multiple CCs are selected for transmitting the feedback based at least in part on a transmission time interval (TTI) duration for the at least one CC; and
means for transmitting, over the one or more of the multiple CCs, feedback related to receiving the communications from the serving node over the at least one CC,
wherein the TTI duration for the at least one CC is two symbols and wherein the one or more of the multiple CCs are selected for transmitting the feedback based at least in part on determining that a second TTI duration of the one or more of the multiple CCs is two or four symbols.

28. A non-transitory computer-readable storage medium for communicating feedback for communications received over multiple component carriers (CCs) in wireless communications, comprising:
    code for receiving the communications from a serving node over the multiple CCs configured in carrier aggregation or multiple connectivity;
    code for determining one or more of the multiple CCs for transmitting feedback regarding the communications received over at least one CC of the multiple CCs, wherein the one or more of the multiple CCs are selected for transmitting the feedback based at least in part on a transmission time interval (TTI) duration for the at least one CC; and
    code for transmitting, over the one or more of the multiple CCs, feedback related to receiving the communications from the serving node over the at least one CC, wherein the TTI duration for the at least one CC is two symbols and wherein the one or more of the multiple CCs are selected for transmitting the feedback based at least in part on determining that a second TTI duration of the one or more of the multiple CCs is two or four symbols.

29. The apparatus of claim 27, wherein the means for determining the one or more of the multiple CCs for transmitting feedback determines the one or more of the multiple CCs as assigned for transmitting feedback for a first group in multiple control channel groups, wherein the at least one CC is assigned to the first group.

30. The non-transitory computer-readable storage medium of claim 28, wherein the code for determining the one or more of the multiple CCs for transmitting feedback determines the one or more of the multiple CCs as assigned for transmitting feedback for a first group in multiple control channel groups, wherein the at least one CC is assigned to the first group.

* * * * *